United States Patent [19]

Tehsildar et al.

[11] Patent Number: 4,524,496
[45] Date of Patent: Jun. 25, 1985

[54] CASKET STAY MECHANISM

[75] Inventors: Tehmtan J. Tehsildar, West Lawn; Robert R. Colbert, Lititz, both of Pa.

[73] Assignee: Boyertown Casket Company, Boyertown, Pa.

[21] Appl. No.: 449,305

[22] Filed: Dec. 13, 1982

[51] Int. Cl.³ .................. A61G 17/00; F16C 11/00; F24H 3/00
[52] U.S. Cl. .......................... 27/18; 220/335; 403/92; 16/335
[58] Field of Search ............... 27/16, 18; 16/335, 375; 220/335; 403/85, 93, 92

[56] References Cited

U.S. PATENT DOCUMENTS

| | | | |
|---|---|---|---|
| 736,714 | 8/1903 | Gendron | 220/335 X |
| 1,165,894 | 12/1915 | Negraval | 220/335 |
| 1,231,445 | 6/1917 | Stecker | 403/92 |
| 2,707,064 | 4/1955 | Castello | 217/60 |
| 2,848,783 | 8/1958 | Keller, Jr. et al. | 27/18 |
| 2,929,528 | 3/1960 | Hoag et al. | 217/60 |
| 3,060,546 | 10/1962 | Nelson | 27/18 |
| 3,392,997 | 7/1968 | Seckerson et al. | 292/268 |
| 3,959,859 | 6/1976 | Stein, Jr. et al. | 27/18 |

FOREIGN PATENT DOCUMENTS 348370  5/1931  United Kingdom .................. 16/335

Primary Examiner—Richard J. Johnson
Attorney, Agent, or Firm—Charles H. Lindrooth; Peter Y. Lee

[57] ABSTRACT

A stay mechanism for two hingedly connected members which are moveable between a first unengaged position and a second engaged position. An arm is hingedly attached at one end to a first member. The other end of the arm has a protrusion which is resiliently held in the pocket portion of a resilient strip attached to a second member, when the members are in the second position. A camming surface, facing the pocket of the resilient strip, defines, with the pocket, a resilient enclosure for the protrusion. The protrusion may be forced to slide out of the enclosure when the two members are moved towards the first position, by the resilient deformation and opening of the pocket. The resilient strip also has an inclined portion adjacent the pocket portion which serves as a guide for the protrusion into the pocket, when it is desired to move the members from the second position into the first position.

11 Claims, 8 Drawing Figures

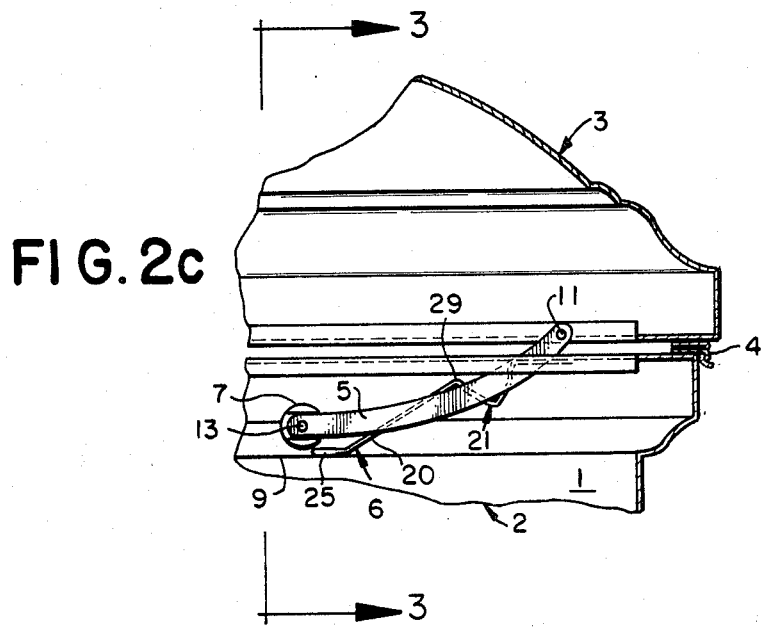
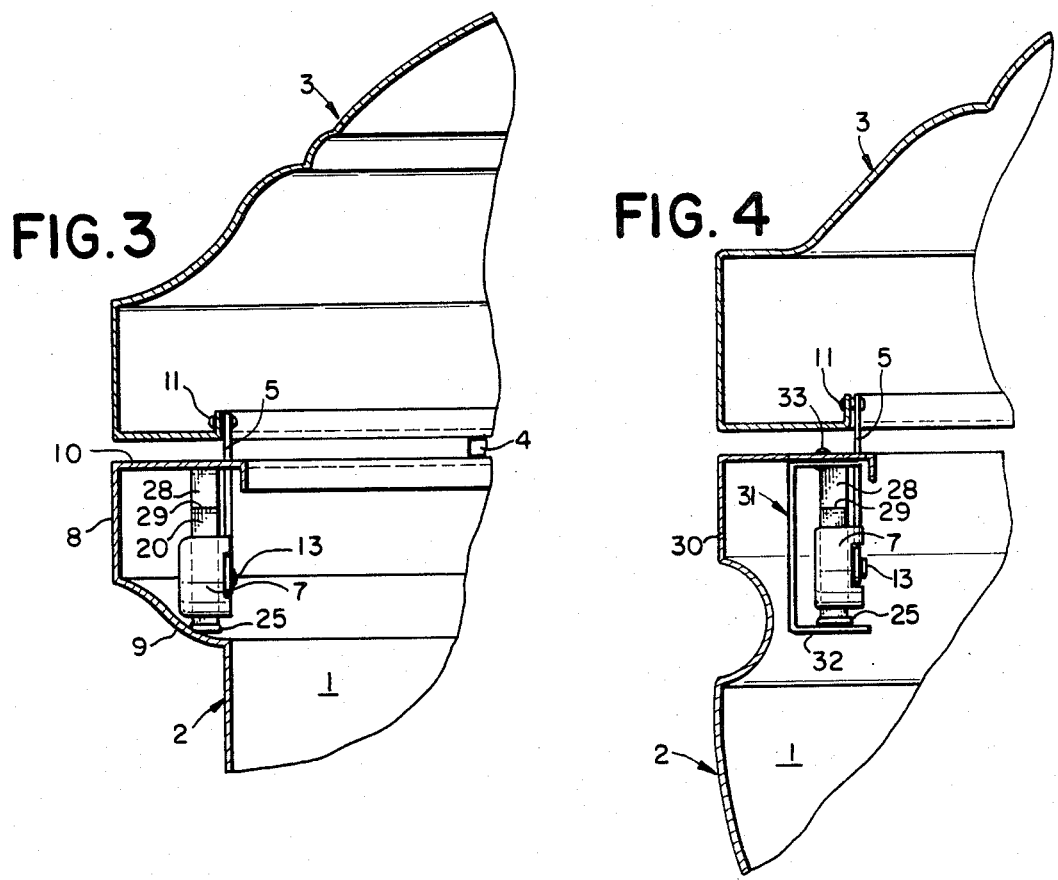

CASKET STAY MECHANISM

FIELD OF THE INVENTION

Although having utility for other purposes, the invention relates to improvements in hardware useful in burial caskets or the like and, specifically to a mechanism for positively holding a member such as a casket lid in an open position, while permitting its opening and closing in a smooth and continuous operation.

BACKGROUND OF THE INVENTION

Although the art of constructing burial caskets is as old as civilization, there has been little change in the basic structure of a casket in modern times. Fundamentally, a casket comprises two hingedly connected members, one of which is a casket body, the other one of which is a top. Frequently the top is divided into two sections which are hinged to the body. Caskets may be constructed from wood, metal or other materials, and may be quite heavy, depending on the design. Casket lids are normally attached to the casket body in such a way that the top can only be opened to a certain maximum degree.

Opening the top too far, or inadvertently forcing it backwards too far, may break the hinge connection. To prevent this, metal brackets or stays are sometimes used which prevent the top from opening beyond a certain desired angle. This angle is such that at the maximum opening, the top may be balanced precariously between falling shut in one direction or leaning backward and possibly toppling in the other direction, if the casket were accidentally bumped.

It is often desirable or necessary that the lid be held open for an extended period of time, for example, during the viewing period or while arranging flowers and the like. It is also advantageous to keep the lid open for purposes of display in a showroom to show to funeral directors or other potential purchasers. During these periods if the casket lid is not properly secured in the open position, it may easily be bumped and fall down, and cause a disturbance or injure persons standing nearby.

In the past, funeral directors have attempted to solve this problem by tying the lid up with string to a hook on the ceiling or some attachment on the wall. Although this method prevents the falling of the casket top, it is rather cumbersome and the string is not easily hidden from view. Also commonly used are breaker arms which lock into position upon the full opening of the casket top. In order to shut this type of casket, it is necessary to break the arm manually while at the same time lifting the casket top to relieve pressure from the breaker arm, and this usually requires the labor of two persons to operate. The breaker arm is also defective in that it has a tendency to get caught in the interior fabric of the casket, further complicating the closing of the top. If the breaker arm is not covered with fabric, it would detract significantly from the overall appearance and attractiveness of the prepared casket.

There have been other types of retaining brackets proposed which would require a manual adjustment for locking the casket top in an open position. For example, U.S. Pat. No. 2,848,783 shows a retaining bracket for a casket, which must be manually tightened in order to stay the lid in the open position. These are also not very practical or convenient of use because of the extra adjustments required.

It is accordingly an object of the invention to provide a stay mechanism to keep two hingedly connected members such as a casket lid and casket body at a predetermined distance apart, which mechanism operates smoothly, dependably and quietly.

It is more specifically an object of the invention to provide a casket top support mechanism which can yieldingly support a casket lid in an open position.

It is also an object of this invention to provide a stay mechanism having a simple design which is operable by a single person without the need for making any manual adjustments.

It is a further object of the invention to provide a casket lid support which is attractive and unobtrusive, relatively inexpensive and easy to install, and has no tendency to tangle interior fabric.

SUMMARY OF THE INVENTION

In accordance with these and other objects, there is provided an arm, one end of which is pivotally attached to a first member such as a casket lid, while the opposite end has a protrusion or knob engaged in a second member, which may be a casket body. When the two members are in a first position, for example the closed position of a hingedly connected casket lid and body, the stay mechanism is disengaged. When the two members are in a second or open position, the protrusion on the arm is retained in the pocket of a resilient strip which is attached to the second member at one end of the strip. The other end of the resilient strip comprises an inclined guide which slopes away from the pocket. An opposing guide, also attached to the second member, faces the pocket to define with the pocket an enclosure for the protrusion. The protrusion is resiliently confined within the enclosure defined by the pocket and opposing guide, but is able to slide out onto the inclined portion if the resilient strip is deformed to provide a sufficient opening from the pocket.

When it is desired to disengage the stay mechanism and to move the members to the first position, it is necessary only to push the moveable member in the direction of the first position. This motion forces the arm, and the protrusion attached thereto, in the direction of the sloping portion of the resilient strip. The resultant pressure of the protrusion against the springy pocket effects a sufficient deformation of the pocket to permit the protrusion to be released therefrom, and for the first and second members to move to the first position.

In order to engage the stay mechanism, it is necessary simply to pull the moveable member to the second position, thereby sliding the protrusion upon the sloping portion toward the springy pocket. The pressure of the protrusion against the sloping portion forces the edge of the pocket to resiliently open, thereby permitting the protrusion to pass into the pocket.

BRIEF DESCRIPTION OF THE DRAWINGS

The invention will now be described in detail with reference to specific preferred embodiments and to the accompanying drawings. In the drawings:

FIGS. 2a, 2b, 2c, are side views showing three stages in the operation of the top support mechanism of FIG. 1;

FIG. 3 shows a vertical sectional view taken along line 3—3 of FIG. 2c on an enlarged scale with respect to FIG. 2c;

FIG. 4 shows a vertical sectional view similar to FIG. 3 but illustrating a modification used in a different form of a metal casket;

DESCRIPTION OF THE PREFERRED EMBODIMENTS

Figure 1:
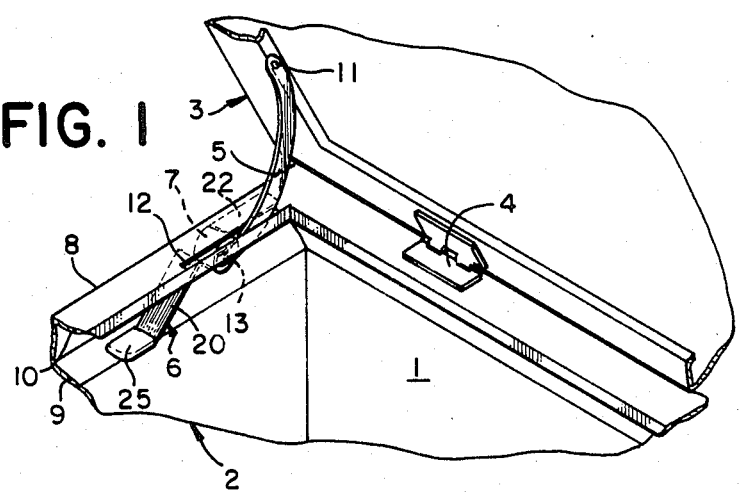
FIG. 1 is a perspective view showing a preferred embodiment of the stay mechanism, used as a casket top support, and also showing a portion of a metal casket.
Figure 2A:
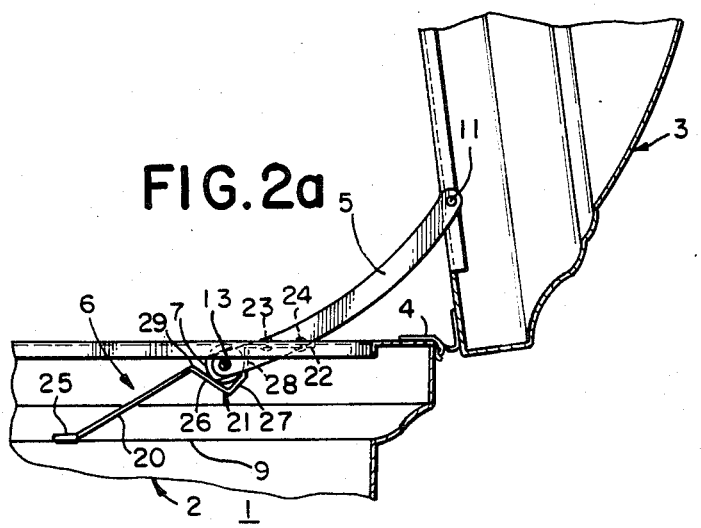

Referring to the drawings and particularly to FIGS. 1 and 2 thereof, burial casket 1 is a metal-type casket having two members, body 2 and lid 3, connected by hinges, one of which is shown at 4. The members may be in a first position wherein lid 3 is closed upon casket body 2, FIG. 2c, or they may be in a second position wherein the lid has been fully opened for display or viewing, FIG. 2a.

Along the top edge of casket body 2 is a rim 8 having a lower surface 9 and an upper surface 10 in which is installed a resilient strip 6. The support arm 5 is pivotally attached at one end to the casket top 3 by fastener 11, and has a plastic protrusion or knob 7 attached to its other extremity. The arm 5 reaches inside rim 8 through the slot 12 in upper surface 10, such that knob 7 resides inside rim 8.

The upper surface 10 retains the knob 7 within the cavity of rim 8. Upper surface 10 thus acts as a camming surface preventing the arm 5 and casket lid 3 from further motion upward or backward beyond its predetermined open viewing position. Slot 12 serves as a guide for arm 5 to keep arm 5 and knob 7 on track during opening and closing movement.

Knob 7 is secured to the lower extremity of arm 5 by the fastener 13, which is preferably a screw. The resilient strip 6 is preferably made of 0.046 inch annealed steel, and the knob 7 is preferably a round plastic knob having a smooth and slippery surface. The arm is preferably curved at the middle toward the casket hinge, so that it is unobtrusive and visually more attractive. Although only one arm 5 and one support mechanism is described below, it is understood that a pair of supports are preferably used, one at each end of the casket.

Referring to FIG. 2a, the resilient strip 6, although constructed from a single narrow sheet of springy steel, has three definable portions, one being a sloping or inclined portion 20, a second being a pocket 21, and a third being an attachment portion 22. The attachment portion 22 is attached to the upper surface 10 of the casket rim by fasteners 23, 24. The pocket 21 is itself composed of three straight segments, 26, 27, 28, which are angularly connected so as to provide a snug fitting seat for knob 7. The segment 26 presses against the knob 7 in a direction substantially opposing a downward force transmitted to knob 7 through arm 5. Thus, any tendency for the top 3 to fall shut would be opposed by the pressure of segment 26 upon knob 7. When the pocket 21 is in a closed attitude, as shown in FIG. 2a, the spacial gap between neck 29 and the upper surface 10 is substantially smaller than knob 7, so that knob 7 is securely retained in pocket 21. The upper surface 10, facing the pocket 21, also serves to retain knob 7 securely in place when the casket lid 3 is in the open viewing position.

Figure 2B:
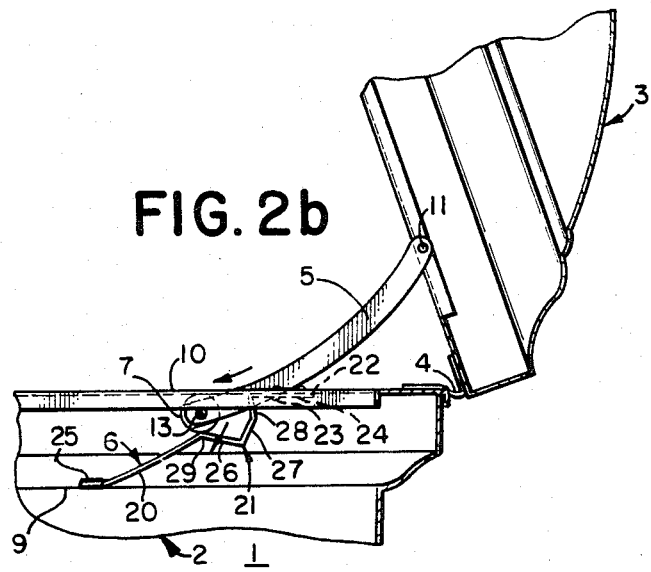

Referring to FIG. 2b, when it is desired to disengage the stay mechanism, one need only positively pull the casket lid 3 forward and downward in a closing motion. Since the pocket 21 is resilient and deformable, it will elastically deform itself to widen the gap between neck 29 and surface 10 when a sufficient force has been applied against segment 26 through knob 7 and arm 5. Upon further closing movement of the lid 3, the knob 7 is forced beyond neck 29, out of the pocket 21.

The sloping portion 20 has, at its extremity, a plastic foot 25 which contacts, and is able to slide upon, the lower surface 9 of the casket body rim. The surface 9 acts as a means for stopping the sloping portion from swinging perpendicularly away from the knob; in FIG. 2b, surface 9 prevents sloping portion 20 from swinging downward. In this way surface 9 pushes the sloping portion 20 upward and exerts a further pressure tending to keep knob 7 securely in the pocket 21. By stopping sloping portion 20 from swinging perpendicularly away, the knob 7 is able to slide up the sloping portion 20 toward neck 29 in a more smooth and gradual ascension, resulting in a greater ease in the casket opening operation. The plastic foot 25 is preferred in order to allow a freedom of sliding upon surface 9, without any noticeable screeching or binding, during operation of the stay mechanism.

Referring to FIG. 2c, the casket top 3 has been completely shut and the support mechanism completely disengaged. In order to engage the support mechanism, it is merely necessary to pull the casket top 3 upward and backward, so as to pull the knob 7, via arm 5, towards the pocket 21. The sloping portion 20 serves here as a guide for knob 7, directing knob 7 to the neck 29. The upper surface 10, facing the pocket 21 and sloping portion 20, also acts as a guide for knob 7, FIG. 2b. Because of the gradual sloping of sloping portion 20 enhanced by the stopping action of surface 9, there occurs only a gradual deformation of the resilient metal strip 6 during the opening of lid 3, and it is relatively easy to pull knob 7 upon sloping portion 20, through neck 29, and into pocket 21. Consequently it is fairly easy to open casket lid 3 into the supported, viewing position. Once the top 3 has been placed in the viewing position, and the knob 7 stopped by segments 27, 28 and upper surface 10, the recessed portion 21 resiliently snaps back into a closed attitude bringing neck 29 closer to surface 10, and resiliently holding knob 7 in place.

The segment 26 should be a straight segment so that in the casket closing operation knob 7 would be able to smoothly slide from the seated position towards neck 29, deforming the springy pocket 21 in a gradual and continuous motion. The segments 27, 28 need not be straight, although that is also preferred.

Referring to FIG. 3, it is seen that the cavity of rim 8 may have an irregular shape, and the lower surface 9 need not be exactly flat, as long as it is able to stop the foot 25 at the extremity of sloping portion 20 from swinging downward. If a casket has a rim 8 which does not have a surface 9 capable of supporting the foot 25, there is provided a bracket 31, as in FIG. 4, having a surface 32 which effectively stops the foot 25 from swinging downward. In the alternative embodiment of FIG. 4, the bracket 31 is rigidly attached to the casket body 30 by use of fasteners 33.

Figure 5:
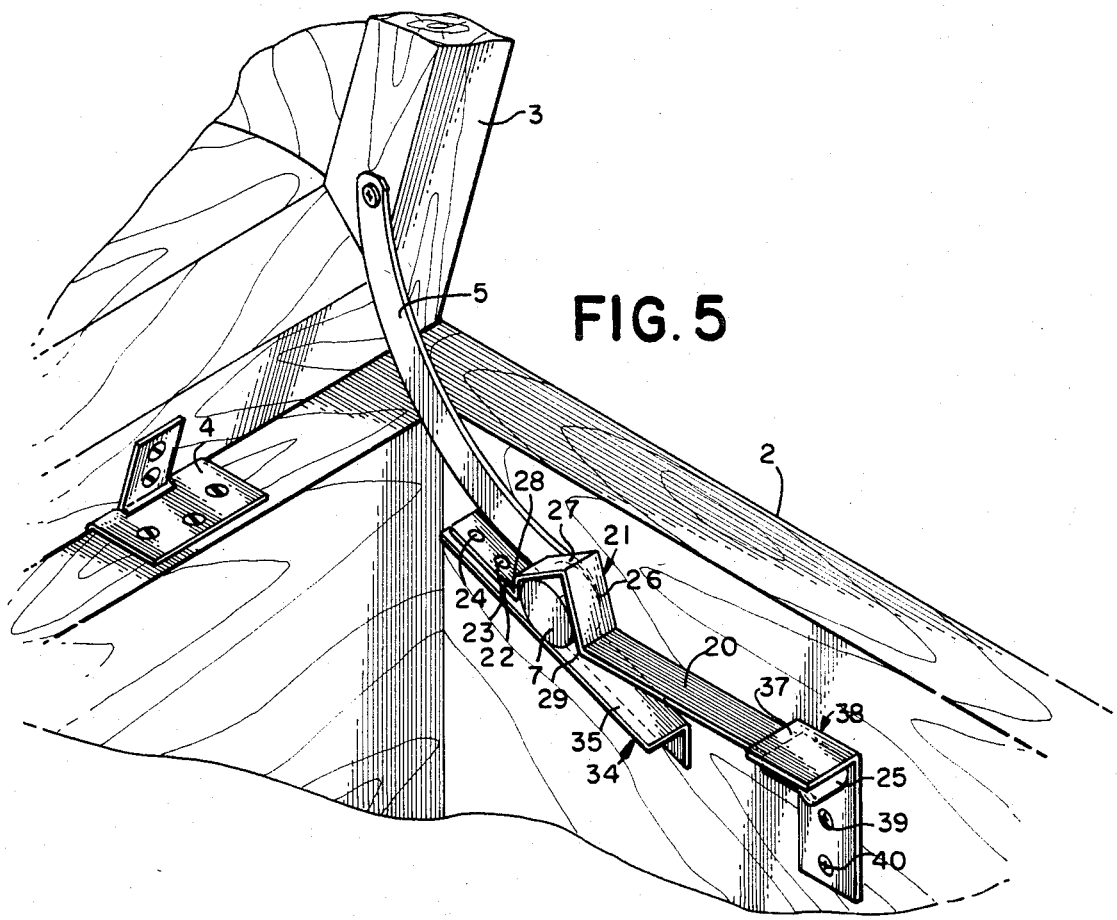
FIG. 5 shows a perspective view of an embodiment of this invention modified for use in a wooden casket.

FIG. 5 shows an embodiment of the invention which is well suited for use in wooden caskets although adaptable for metal caskets as well. The orientation of resilient strip 6 has been inverted in this embodiment, and an angle bracket 34 formed of pressed steel or other suitable material is attached to the casket body 2. Angle bracket 34 has a smooth camming surface 35, to one end of which is secured the attachment portion 22 of the resilient strip, by use of fasteners 23, 24. The resilient strip has a pocket 21 comprising the straight segments 26, 27, 28 which in its closed attitude resiliently retains the knob 7 so as to keep the casket lid 3 in an open viewing position. The sloping portion 20 slopes away from neck 29, and has at its extremity a plastic foot 25 which slidingly contacts a stop 37 of bracket 38. Bracket 38 is rigidly secured to casket body 2 by use of screws 39, 40.

In operating the embodiment of FIG. 5, the surface 35 functions similarly to upper surface 10 of the embodiment shown in FIGS. 1-3, in that surface 35 rigidly retains knob 7 against pocket 21, and provides a smooth surface upon which knob 7 can slide, when the top support mechanism is being engaged or disengaged. Camming surface 35, facing sloping portion 20 and pocket 21, also serves as a guide for knob 7. The stop 37 functions similarly to the lower surface 10 of the preferred embodiment in that stop 37 prevents the sloping portion 20 from swinging perpendicularly outward (upward in this case) from the knob 7 during the operation of the mechanism. The pocket 21 and sloping portion 20 in FIG. 5 are slightly removed from the surface of the casket 2 to provide a clearance for arm 5 when knob 7 is moved downward. The angle bracket 34 is flush with the surface of casket body 2, so that arm 5 cannot ever drop lower than angle bracket 34, even when lid 3 has been fully shut.

Figure 6:
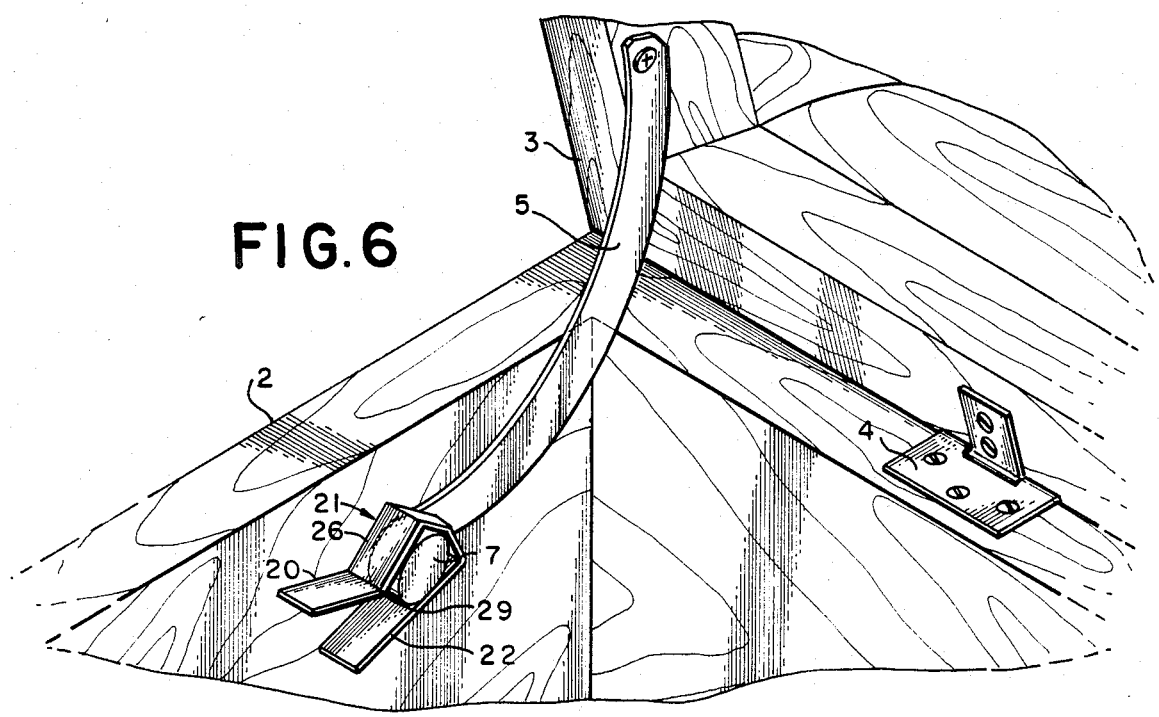
FIG. 6 shows a perspective view of a different embodiment of the invention.

An alternative and simpler embodiment of the invention is shown in FIG. 6 in connection with a wooden casket. Here, the attached portion 22 of the resilient strip, attached to the casket body 2 by screws (not shown), also doubles as a camming surface, much like the upper surface 10 of the embodiment of FIGS. 1-3. The pocket 21 and the sloping portion 20 are slightly spaced away from the surface of the casket body 2, in order to provide clearance for arm 5 during movement of knob 7 into and out of the pocket 21. Because the attached portion 22 is flush with the surface of casket body 2, the arm 5 and its attached knob 7 cannot fall below portion 22. Since there is no means for stopping sloping portion 20 from swinging perpendicularly away from the roller, the opposition of segment 26 against the pressure exerted through knob 7 is somewhat less than in the other embodiments. However, this embodiment has been found to be useful in various applications where an inexpensive and very simple top support is desired.

Although use of a plastic knob is preferred, it should be obvious that the knob 7 need not be plastic, as long as it has a smooth surface with a low coefficient of friction and, preferably, a substantially rounded shape. Plastic is a preferred material as it lends itself to silent operation. Although the strip 6 has been made from an elastic and springy steel, it is understood that any other material having similar qualities of strength, resilience and durability may be used.

The segment 26 of the preferred embodiment has a smooth straight surface which permits a smooth motion of knob 7 towards neck 29 with an accompanying gradual deformation in the pocket 21 that produces a smooth, as opposed to an abrupt noisy operation. It is preferred that the segments 26, 27 be angularly connected in approximately a right angle, so that the pocket 21, together with the camming surface, would snugly surround and securely retain knob 7 in the position which corresponds to an open-casket viewing position. In this open posture, the casket lid 3 has no tendency to shake or sway, and resists any minor vibrations or bumps which may otherwise tend to topple it. Nevertheless, the lid 3 may be easily closed by exerting a smooth and forceful pressure on lid 3; and a single person can easily accomplish the engagement or disengagement of the support mechanism without requiring any manual adjustments, and without risking damage to the interior fabric in the casket.

I claim:

1. A stay mechanism for a first member hingedly connected to a second member for relative movement of the members between first and second positions, the stay mechanism yieldably retaining said members in the second of said positions, said mechanism comprising:
    an arm pivotally attached at one end to the first member at a point on the first member offset from the hinged connection, and having a sidewise protrusion at its other end;
    a guide means on the second member for guiding the protrusion into and out of the second position, said guide means comprising a resilient strip secured at one end to said second member and having a resilient pocket shaped to receive the protrusion, said pocket being adjacent said one end of the resilient strip, said guide means further comprising a camming surface fixed with respect to the second member, said camming surface facing the open pocket, said resilient strip having a portion inclined away from the pocket and the camming surface, said inclined portion serving to guide the protrusion towards the pocket as the members are moved towards the second position, the camming surface being spaced relative to the pocket to define an entrance to the pocket which is expanded by yieldable movement of the pocket in an interaction of forces between the protrusion, the pocket and the camming surface, as the protrusion enters and leaves the pocket and as the members are moved into and out of the second position, said pocket and the camming surface yieldably retaining the protrusion within the pocket when the members are in the second position, the end of the strip remote from the pocket being free for limited movement during said yieldable movement of the pocket.

2. The stay mechanism of claim 1 further comprising means for stopping the end of the inclined portion away from the pocket from swinging perpendicularly away from the camming surface when the pocket is deformed by the protrusion, said stopping means permitting free movement of the inclined portion away from and towards the pocket.

3. The stay mechanism of claim 2 where the camming surface is a surface of a burial casket member.

4. The stay mechanism of claim 2 where the camming surface is a rigid, substantially straight surface facing the open pocket and inclined portion, and affixed to the secured end of the resilient strip.

5. The stay mechanism of claim 1 where the pocket includes a straight segment adjacent the inclined portion upon which the protrusion may slide smoothly out of the pocket, in movement of the members out of the second position.

6. The stay mechanism of claim 5 where the straight segment has a length of approximately ½ to 1½ times the diameter of the protrusion.

7. The stay mechanism of claim 6 where the camming surface is a surface of a burial casket member.

8. The stay mechanism of claim 5 where the straight segment pushes against the protrusion in a direction substantially opposing the movement of the protrusion and arm when the members are urged from the second position towards the first position.

9. The stay mechanism of claim 1 where the pocket faces a generally upward direction and the camming surface facing the pocket faces a generally downward direction.

10. The stay mechanism of claim 1 where the pocket faces a generally downward direction and the camming surface facing the pocket faces a generally upward direction.

11. The stay mechanism of claim 1 where the pocket comprises two straight segments angularly connected in approximately a right angle, one of said segments being adjacent the inclined portion, so that the protrusion can slide smoothly and gradually upon said one segment out of the pocket during movement of the members out of the second position.

* * * * *